Patented Apr. 21, 1942

2,280,451

UNITED STATES PATENT OFFICE 2,280,451

FERTILIZER AND PROCESS FOR MAKING THE SAME

Griffith H. Riddle, Brookline, Mass., assignor to Research Foundation, Inc., Wilmington, Del., a corporation of Delaware No Drawing. Application November 25, 1939, Serial No. 306,195

14 Claims. (Cl. 71—2)

This application is a consolidation and continuation-in-part of my co-pending applications filed June 11, 1937, and serially numbered 147,712, 147,713, 147,714, 147,718, 147,719, 147,720.

The purpose of this invention is to provide a fertilizer material containing at least three of the 64 minor elements, as defined in agronomy, in a form that may produce plant stimulation without danger of toxic effects such as are evidenced by growth inhibition or gross morphological changes, and this without the necessity of soil analyses. It is likewise the purpose of this invention to provide a process for making such a fertilizer so that it may be most efficient.

The following eliminations have been made from the list of the 92 elements for the purpose of defining all of those which could be included in the category of minor elements.

TABLE I

The six rare gases—
 Helium, neon, argon, krypton, xenon, radon
The element plants obtain from the air—
 Carbon
The two elements invariably found in all soil—
 Silicon, aluminum
The eight elements usually contributed in "complete mixed fertilizer"—
 Nitrogen, phosphorus, potassium, sulfur, calcium, magnesium, sodium, chlorine
The seven precious metals relatively insoluble in soil solutions—
 Platinum, palladium, iridium, osmium, rhodium, ruthenium, gold
The two elements not known to be available from any source because of their rarity—
 Virginium, alabamine
The two elements which plants obtain from water—
 Oxygen, hydrogen The preceding table contains two element groupings, one of eight elements, entitled "usually contributed in complete mixed fertilizer" and the other, two elements, entitled "invariably found in all soil." These eight elements in one group are now generally known as the major elements, to differentiate them from those included in the minor element group. Frequently this group of major elements is considered to contain silicon and aluminum found in the other group because the quantity occurrence of all 10 of them in plant life is such that they seem entitled to this classification. These 10 elements will be referred to hereafter as major elements.

This eliminates 28 from consideration, leaving 64 which will be referred to hereafter as minor elements. The list follows:

TABLE II

| | | | |
|---|---|---|---|
| Iron | Tin | Indium | Yttrium |
| Titanium | Tungsten | Caesium | Ytterbium |
| Manganese | Beryllium | Germanium | Dysprosium |
| Chromium | Molybdenum | Zirconium | Terbium |
| Barium | Cadmium | Hafnium | Erbium |
| Strontium | Bismuth | Tantalum | Holmium |
| Zinc | Lithium | Columbium | Thulium |
| Lead | Mercury | Rhenium | Lutecium |
| Boron | Selenium | Masurium | Europium |
| Arsenic | Tellurium | Cerium | Gadolinium |
| Copper | Bromine | Lanthanum | Thorium |
| Fluorine | Vanadium | Praseodymium | Uranium |
| Iodine | Silver | Neodymium | Actinium |
| Nickel | Rubidium | Illinium | Polonium |
| Antimony | Gallium | Samarium | Protoactinium |
| Cobalt | Thallium | Scandium | Radium |

I have used all of the above minor elements in at least one of their forms in my agricultural experimental work either separately or in various combinations.

In recent years the extreme importance of the minor elements and their relation to plant stimulation, growth, and deficiency diseases has come to be increasingly appreciated by both the agronomist and plant physiologist. Most of the experimental agricultural stations in this country and in the major countries abroad have been experimenting with a view to determining the functions of minor elements in plant life. Such work has been seriously handicapped because of the imminence of toxicity due to the use of water-soluble salts as a source of the minor elements.

The quantity of any such water-soluble salt which may be used to best advantage on any particular soil for any particular crop must be determined experimentally in the field by trial and error methods. The amount of any such salt found most effective for optimum stimulation without toxicity on one soil type may prove toxic on another because the critical amount of such application varies widely between soil types as well as among different kinds of plant life.

Conclusive tests are, therefore, difficult to obtain for a few crops on even a single soil type, and the constant drain on the minor elements contained in the soil, due to harvesting, causes such results to be inadequate for reference in future use.

Common practice in the application of water-soluble salts in the field consists of a single application, such application being in an amount estimated to be sufficient to carry the plant through to maturity. Such salts so applied being water-soluble rapidly present an over-sufficiency of ions to the plant root membrane which are then available for immediate assimilation, thus creating an environment unnatural to the plant which, of necessity, must assimilate an abnormal quantity of such ions if the application is substantially in excess of current plant requirements. When this occurs toxicity usually results, although in some soil types lack of moisture or the presence of buffer factors may afford some protection.

I have discovered that the minor elements may be used to provide optimum stimulation without fear of toxicity, providing properly manufactured substantially water-insoluble inorganic forms are used as their source, which differentiate them from water-soluble salts as to immediate availability for assimilation the limiting factor against toxicity is then the kind and quantity of acids present in the soil to which they are applied.

It has been established that those soil types which are commonly considered fertile have a pH between the limits of pH 4.5 and pH 6.75. Other soil types having a pH more alkaline and some more acid are known and are used for agricultural purposes, but these are not usually prolific nor generally considered good agricultural soils. Several thousand different soil types have been identified by the Soil Survey Division of the Bureau of Chemistry and Soils of the United States Department of Agriculture. These have not been classified according to pH but as might be expected their pH range varies within all possible pH limits of soil.

I have found that to obtain optimum results with my new fertilizer material it should be manufactured so that its surface area exposed to the soil acid solutions, and so vulnerable for solubility, is correlated to the acidity of the soil type upon which it is to be used, and since I use at least three of the 64 minor elements, I have found it best that the specific surfaces of all forms so used be proportional to their relative rates of solubility, and that weight distribution of particle size should diminish uniformly.

I have discovered that reciprocal element assimilation, of the ions of all the elements present in excess, assimilable by the plant, is effected by plant life in the event of a deficiency of any of them in the soil. The quantity of each of all such elements so assimilated, in the event of a deficiency in any single element, is proportional to the saturation constant specific to the plant for each of them. The amount of any element which is normally assimilable by any given plant is controlled by the quantity and kind of organic acids synthesized by that plant. Ref: "Element Assimilation by Plant Life," Riddle, 1938.

The term "saturation constant specific to the plant" is used herein to designate the quantity of any element which a species of plant would assimilate if there were no solid deficiencies. This varies widely between different types of plants.

The quantity of each of the elements assimilated by all types of plant life is consistently the same for any particular species of plant providing there are no soil deficiencies. No soil contains a sufficiency of all of the elements common to plant fluids nor does any soil contain a sufficiency of all but one of them. Most good agricultural soils would show a deficiency of a substantial number of such elements if a complete analysis were made, while many ordinary agricultural soils could be shown to be deficient in a large number of these elements. All such soils, however, enjoy a definite sufficiency, to excess of a substantial number of certain of these elements, such excess sometimes being sufficient for agricultural purposes for hundreds of years. ("Element Assimilation by Plant Life With Reference Abstract Bibliography," Riddle, 1938, p. 94.)

Because all soils have element deficiencies, only by quantitative analyses of the same species of plant grown on many soils, then taking a mean or average cross section of determinations for each element so analyzed can the saturation constant specific to the plant for that element be ascertained. This is the procedure which I followed in my experimental work to determine the saturation constant specific to a number of plants for many elements. This work was carried out on 28 crops obtained from 32 states. Specimens used in this analytical work were usually purchased in carload lots, and the work extended over a period of approximately three years.

The following three tables, III, IV and V illustrate the saturation constant specific to the plant for barium, manganese, and iron in several plants. Table III shows the variation of barium content in several different kinds of plant leaves (dry basis); Table IV shows the variation of manganese content in several different kinds of plant seeds (dry basis); and Table V shows the variation of iron content in several different kinds of entire plants (green basis). The data contained in these tables, particularly Table V, furnish conclusive evidence of varying "saturation constants specific to the plant."

TABLE III

BARIUM (Dry basis)

| Plant leaves | Per cent |
| --- | --- |
| Walnut leaf | 0.0474 |
| Mulberry leaf | .0436 |
| Cherry leaf | .0247 |
| Plum leaf | .0234 |
| Elm leaf | .0224 |
| Black-locust leaf | .0204 |
| Dogwood leaf | .0141 |
| Pear leaf | .0123 |
| Cottonwood leaf | .0033 |
| Wild-olive leaf | .0030 |

Showing different analytical results obtained from each—with greatest variation more than 15 to 1.

TABLE IV

MANGANESE (Dry basis)

| Plant seeds | Per cent |
| --- | --- |
| Hemp | 0.0165 |
| Tobacco | .0073 |
| Oats, six varieties | .0050 |
| Wheat, ten varieties | .0047 |
| Crimson clover | .0029 |
| Sunflower | .0023 |
| Beans, five varieties | .0018 |
| Alfalfa | .0012 |

Showing different analytical results obtained from each—with greatest variation more than 13 to 1.

TABLE V

IRON

*(Green basis)*

| Entire plant | Per cent |
|---|---|
| Parsley | 0.01921 |
| Spinach | .00250 |
| Lettuce, green leaf | .00187 |
| Watercress | .00124 |
| Cabbage, red | .00104 |
| Cabbage, green | .00079 |

Shows different analytical results obtained from each—with greatest variation more than 24 to 1.

Barium—Ref.—"Minor Elements" Ref. Abst. Bib., Riddle, #501, 1938.
Manganese—Ref.—Jour. Agr. Res. 23, 395, 1923.
Iron—Ref.—U. S. Dept. of Agr. Cir. 205, Feb., 1932.

When ores are used as a source of the minor elements the relative rate of solubility of the desired mineral contained in the ore should be ascertained. When this has been done, and a solubility factor allotted to such mineral, this factor may be used for future ores containing the same mineral. This is possible because the relative rate of solubility of the same mineral irrespective of its source is a constant in any given solution under identical conditions, and ores containing them which have been processed to any of my specifications are ground finely enough so that such mineral values are completely unlocked from the accompanying gangue.

This is of considerable value because it precludes the necessity of testing future lots of ores purchased which likewise contain those minerals previously tested. This would hold true even if the form containing the minor element was either metallic or elemental. If it is not feasible to ascertain the relative rate of solubility of the mineral as compared to others that may be used, but one prefers to test the entire ore containing such minerals, a correction factor may be used based upon the relative rate of solubility of the gangue, taking into consideration its quantity occurrence in the ore as this is usually measurable. Such gangue content consisting of undesirable minerals may be substantially disregarded in arriving at a solubility factor.

The raw materials comprising the minor elements which I use in compounding my fertilizer material are usually ores or minerals, although elements, industrial by-products or wastes, electrolytic slimes, or inorganic synthetic compounds may be used. I prefer to use ores. Regardless of the form selected it should be analyzed for its contained minor element content so that predetermined amounts of such element may be applied. The raw material should then be manufactured so that it has the requisite specific surface. This is ascertained from its solubility factor and such requisite specific surface may then be embodied in a uniformly diminishing distribution of particle size in any form processed. A correction factor may be introduced to compensate for the pH of the soil after specific surface has been determined in this manner. Optimum results will be obtained if the above procedure is followed.

This is most important because, by this method, each form of a minor element used may be manufactured so that, when compounded with forms of other minor elements, the rate of solubility of each will be such that all of them will dissolve at a definite and uniform rate thus preventing a deficiency of any one of them, at any time, prior to the complete solution of all, and this, irrespective of the quantity of any minor element used.

The intensive property, specific surface, has proven to be invaluable in the preparation of accurate grinding specifications for the forms of the minor elements to be used in my new fertilizer material. It has made possible the introduction of density in such calculations so that a proper coordination could be given to surface and weight, which are essential factors.

It is generally conceded that the pH of most soils remains comparatively constant during any growing season. Such stabilization is due largely, if not entirely, to the buffering action of the organic acids present in the soil.

The solubility which provides ions of the minor elements available to the plant is effected by a reaction between the hydrogen ions present in the soil solutions and any forms containing the minor elements. This involves a loss of hydrogen ions from the soil solutions which is necessarily followed by further dissociation of the organic acids present, to maintain their dissociation constants, thereby affording new hydrogen ions available for continued solubility, this must intermittently await diffusion pending liquid phase contacts. The rapidity with which this dissociation proceeds throughout the soil depends largely upon temperature, humidity, and precipitation variations as well as the type of soil aggregate. These factors actuate the transient soil solution movements and thereby control the rate of diffusion of all ions in such solutions.

Unfavourable conditions may exist over short periods of time during which diffusion would be inhibited and solubility of the forms of the minor elements in soil during these periods retarded. This is a condition common to all soils, and in correlating relative rate of solubility of a substantially water-insoluble compound to a given pH it must be taken into consideration, because such calculations are based upon time and inhibited diffusion for periods of time would be the same as increasing the pH proportionally.

It is not generally appreciated that the quantity of acid in any soil which is dissociated and therefore available to effect solubility of any forms of the minor elements is comparatively small. Neither is it appreciated that such quantity in any given soil is comparatively constant per unit of time. However, this is the case, and the extent of reactivity between acid and forms of the minor elements is limited to the quantity of such dissociated acid present and the rate of diffusion which affords a replacement of any of the hydrogen ions that may have been consumed in the reaction which effects solubility of any forms of the minor elements.

When my new fertilizer material containing at least three forms of the minor elements is applied to the soil, there is available to each unit weight so applied a specific quantity of acid to effect solubility because under normal conditions the greater the amount of such material applied, the more H-ions there are available to it, due to the surface and volume which it occupies in the soil, the soil pH being comparatively constant, disregarding rate of diffusion of soil solutions. That constituent of the comminuted material which entertains the largest surface will enjoy the greatest portion of the given quantity of acid available to the entire unit weight. Due to the limited quantity of acid available to effect solubility, in comparison to the amount of surface exposed to it, the rate of solubility of each constituent per unit of time may be regulated. This is important because it affords a definite ratio between the number and weight of ions from each constituent to be available to the plant in any given time.

Since the total number of ions of the minor elements thus afforded to the plant from all forms used per unit of time is proportional as predetermined, the importance of correlating specific surface of two, three or more forms, simultaneously applied, lies in the fact that this correlation determines the relative number and weight of the ions of each of the minor elements that are made available simultaneously in that given time.

Since I use at least three forms of the minor elements, not only should their specific surfaces be correlated, but also if more improved results are to be achieved, each should have a uniformly increasing distribution of surface. Predetermined relative solubility of all forms of the minor elements used can only be maintained without erratic fluctuations providing the skew frequency or weight distribution of particle size is uniformly diminishing for each. This can only be achieved by utilizing a closed circuit when grinding for a specific surface falling within the critical range of $$\frac{1,000}{D_s} \text{ cm.}^2/\text{gm. and } \frac{20,000}{D_s} \text{ cm.}^2/\text{gm.}$$

For example, consider a case in which we have two forms of the minor elements so ground that neither has a uniformly diminishing distribution of surface although both are vulnerable to the soil solutions when applied. I have stressed the importance of a definite ratio between the quantity of the ions of the various minor elements available to the plant at all times to avoid sporadic deficiencies.

As solubility of these hypothetically ground forms begins, there exists a ratio of ions available to the plant proportional to the ratio of the immediately exposed surfaces to the soil acids. As the surface of each form disappears with progressive solubility, the ratios of exposed surface of each of them would change with respect to each other. Hence, the ratio of ions contributed to the solution would vary in the same degree that the exposed surfaces of each of the forms varied with respect to each other. The more the specific surfaces depart from uniformly increasing states, or the total surfaces depart from uniformly decreasing states, the greater will be the variations in the ratios of available ions, thus causing reciprocal element assimilation to a greater or lesser degree. Such reciprocal element assimilation is responsible for toxicity in plant life.

Preferential selectivity exhibited by plants in the assimilation of constant quantities of the ions of any of the elements which they require is today well nown. Such preferential ability may be exercised by the plant without deviation from the saturation constant specific to the plant for each element only in the event that a sufficiency of ions of all such elements are available to the plant root membrane. This situation presumably never occurs because of at least some deficiencies occurring in every soil.

The degree of abnormality which may be caused within a plant due to an over-assimilation of any element is determined by the degree to which the ions in the soil solutions are unbalanced with respect to that point. If this is excessive at any given time, due to an erratic presentation of ions for assimilation, toxicity will occur and the degree of such toxicity due to over-assimilation will be proportional, as the excess of assimilated ions of any element is to its saturation constant specific to the plant.

A good example is an over application of a water-soluble salt containing any one of the 64 minor elements. Toxicity invariably occurs due to the erratic change in the presentation of ions when such salt is so applied. If but a small quantity is used in excess, toxicity would only be evidenced by growth inhibition which might even pass unnoticed unless compared with a control plat. On the other hand, if the amount is increased unduly, such application can prove lethal.

It is believed that even a slight excess in any plant, of any element, essential or stimulating to it, would cause some toxicity to that plant irrespective of the saturation constants specific to the plant for all 74 assimilable elements, providing any one of them were deficient, thus permitting even negligible amounts of others to be assimilated in excess. However, early stages of such toxicity are neither measurable nor visually apparent.

Toxicity to a plant due to an over-assimilation of the elements is proportional to the degree of such over-assimilation, and the point at which such toxicity becomes either measurable or visually apparent depends upon the type of plant and soil media. Wide variations between saturation constants specific to plants cause certain of them, whose saturation constants for certain elements are low, to be particularly sensitive to an over-assimilation of such elements, while others, whose saturation constants for specific elements are high, exhibit greater degrees of tolerance. Therefore, an application which might prove toxic to one plant may be beneficial to another.

The particle size range, derived from grinding any substantially water-insoluble inorganic forms of the minor elements, which lies within the limits from minus 200 mesh down to one micron exhibits certain physical characteristics which are not encountered in any other grinding range. This is substantiated by semi-logarithmic graphs drawn from data of commercial ore grinds compiled by Arthur J. Weinig of the Colorado School of Mines, covering some 25,000,000 tons of various ores from many localities. Such data are available in the following publications:

July quarterly of Colorado School of Mines, 1933, entitled "A Functional Size-Analysis of Ore Grinds," by Arthur J. Weinig.

October quarterly of Colorado School of Mines, 1937, entitled "The Trend of Flotation," by Weinig and Carpenter.

Such curves show that in the range below 200 mesh down to one micron there is a uniformly diminishing weight per cent of particle size throughout the entire range. This uniformly diminishing weight per cent of particle size is in fact predictable mathematically when the weight distribution lying on any two ordinals within this range is known.

The slope and position of a curve in this critical range as depicted on a semi-logarithmic graph can be changed by varying the conditions of grinding, thus affording control of particle size distribution without altering uniform dimihution of weight or uniform increase of surface distribution.

A. J. Weinig's sole interest in the minus 200 range was its usefulness as applied to ore classification and the recovery of values in the mining industry. My interest in what I have established as a critical range from minus 200 mesh to one micron lies solely in its application to agriculture and with reference to its utility in this connection.

This critical range extending from minus 200 mesh to one micron is important for certain of my methods of processing my new fertilizer material. It is characteristic of this range that only within these limits does weight distribution of particle size decrease and weight distribution of surface increase proportionally for all forms of the minor elements used. It is likewise within this critical range only, that erratic variations in the ratios of available ions may be avoided, as between any two or more of such forms, simultaneously applied, thereby permiting a definite correlation between the solubilities of each and concurrently inhibiting reciprocal element assimilation by the plant for these elements.

The lower limit of the critical range terminates at one micron and this is of considerable importance. Particles whose diameter size is less than one micron are today conventionally considered to fall within the so-called colloidal range. Material of this character which is intended to be used as a fertilizer enjoys substantially the same rate of solution, in the soil solutions, as do water-soluble salts, due to its enormous surface area.

Field and water culture experiments conducted by some 400 of the world's leading agronomists have proven the imminence of toxicity when water-soluble forms of the minor elements are used. Experimental work of this character has been conducted by them in carefully controlled tests using more than 60 per cent of the 64 minor elements individually. Abstract references on this work from the technical literature have been compiled and may be found in "The Minor Elements, Their Occurrence and Function in Plant Life," Ref. Abst. Bib., Riddle, 1938. Still more recent work has considerably amplified the list of those elements used, as may be ascertained by consulting the technical literature covering the last 18 months. Every form containing a minor element which has to date been tested, either in the field or in water culture experimental work, has proven to be toxic to plant life if used for fertilizer in the form of a water-soluble salt, and in an amount in excess of that to which the particular plant is accustomed.

The susceptibility of colloidal particles to solubility in the soil acid solutions may be readily appreciated; their ions are thus presented to the plant root substantially as rapidly as would be the case if water-soluble salts were used. Therefore, an application of colloidal particles containing the minor elements, to numerous soil types, for many plants whose saturation constant specific to the plant is low for that particular element, might result in toxicity. This situation is analogous to that which occurs when water-soluble forms are used.

In calculating the specifications to which I wish to manufacture my new fertilizer material, by one of my preferred methods, the pH of the soil to which it is to be applied, as well as the soil solution diffusion rates, must be considered. For example, if the pH of the soil is low, such as pH 4.5, I would then grind each form of the minor elements used to a specific surface in that proportion to which they had been correlated according to their relative rates of solubility, and as coarsely as the most soluble one of them permitted, but still maintain the entire particle size distribution of all of them within the critical range. I have found that the coarsest mean particle size diameter of any properly comminuted form of the minor elements which I can best use on any soil type is approximately 60 microns, the coarsest particle size diameter in the entire distribution being no greater than 74 microns. The specific surface that corresponds to this distribution is $$\frac{1,000}{D_s} \text{ cm.}^2/\text{gm.}$$

where $D_s$ is the density of that form used.

If the pH of the soil is high, such as pH 6.75, I would then grind each form of the minor elements used in that proportion to which they had been correlated according to their relative rates of solubility, and as finely as the least soluble one of them permitted, but still maintain the entire particle size distribution of all of them within the critical range. I have found that the finest mean particle size diameter of any properly comminuted form of the minor elements which I can best use on any soil type is approximately three microns, the finest particle size diameter in the entire distribution being no smaller than one micron. The specific surface that corresponds to this distribution is $$\frac{20,000}{D_s} \text{ cm.}^2/\text{gm.}$$

where $D_s$ is the density of that form used.

The limits of specific surface, $$\frac{1,000}{D_s} \text{ cm.}^2/\text{gm.}$$

and $$\frac{20,000}{D_s} \text{ cm.}^2/\text{gm.}$$

for particle size distributions whose mean particle diameters are 60 microns and 3 microns respectively, are derived from the equation which is based upon the assumption of Stokes' that all particles could be considered spheres. This being the case:

$$\text{Specific surface} = \frac{60,000}{D_s \times d} \text{ cm.}^2/\text{gm.}$$

Where: $D_s$ = density of form used
$d$ = mean particle size diameter in microns of form used.

The foregoing examples illustrate the lowest and the highest specific surface limits to which I prefer to manufacture my most improved fertilizer material for application to soil types having limits between pH 4.5 and pH 6.75. For soil types which enjoy neither extreme of pH, my fertilizer material may be prepared so that the specific surfaces of all forms of the minor elements used are correlated as to their relative rates of solubility, between these limits, with a correction factor applied for soil pH. If so prepared, it is the pH of the soil which finally determines the relative position as regards specific surface that each form will occupy within the critical range. However, I am not confined to the limits $$\frac{1,000}{D_s} \text{ cm.}^2/\text{gm. to } \frac{20,000}{D_s} \text{ cm.}^2/\text{gm.}$$

although optimum results are usually obtained therein.

Certain unusual soil types which might be considered to fall within that classification of normal or good agricultural soils evidence peculiar characteristics in the form of definite deficiencies in one or more of the mineral acids or peculiar reactive characteristics as the result of buffering or accelerated solubility from soil components. A number of such soils have been catalogued by the Soil Survey Division of the Bureau of Chemistry and Soils of the United States Department of Agriculture, and are being investigated. For best results on such soils my new fertilizer material must necessarily be comminuted so that correlation of specific surface between each form of the minor elements used is such that due consideration is given to such peculiar soil characteristics.

There are several major factors of which one or more may be utilized to advantage in the methods which may be employed for obtaining the specifications for my new fertilizer material. Each such factor makes a valuable contribution, not only to the product so processed, but controls the process by which such a product is obtained. Each of them renders a valuable service in inhibiting reciprocal element assimilation, and when all are coordinated optimum results will be achieved.

All of the products used in compounding my new fertilizer material and which may be prepared according to the specification are characterized by two basic factors, listed below:

(1) At least three substantially water-insoluble inorganic forms of the 64 reciprocally assimilable minor elements, each form being a source of a designated quantity of at least one of the minor elements;

(2) And having a specific surface within the range between $$\frac{1,000}{D_s} \text{ cm.}^2/\text{gm. and } \frac{20,000}{D_s} \text{ cm.}^2/\text{gm.}$$

Most of the products used in compounding my new fertilizer material and which may be prepared according to the specification are further characterized, in addition to the two basic factors, by one or more sub-basic factors, listed below:

(a) Each said form having a uniformly diminishing distribution of particle size by weight (within said range);

(b) The ratio of the specific surface of each said form to that of any other form being substantially inversely proportional to the ratio of their rates of solubility;

(c) The ratio of the specific surface of at least one form to that of at least one other form being substantially inversely proportional to the ratio of their rates of solubility;

(d) The mean particle size of each form being such as to give the desired rate of solubility in the soil upon which it is to be used;

(e) The mean particle size of each form being such as to give the desired rate of solubility in a soil having a pH within the range of 4.5 to 6.75;

(f) Such minor element forms being occluded in at least one compound containing a major element;

(g) Particles of the fertilizer material being bound in the form of agglomerates by a water-soluble substance;

(h) Particles of the fertilizer material being bound in the form of agglomerates by a water-soluble substance which includes at least one major element;

(i) Each form being present in the mixture in amount and having a specific surface effective to be gradually available to produce plant stimulation without causing objectionable toxicity;

(j) At least three of the forms being present in the mixture in amounts and having specific surfaces effective to be gradually available to produce plant stimulation without causing objectionable toxicity;

(k) The availability of the minor element ions afforded by each other form being such that they are severally non-toxic.

The efficiency as regards stimulation, as well as inhibition of reciprocal element assimilation will be further enhanced in any of the above methods by the use of an increasing number of forms of the minor elements in excess of three.

I do not wish to confine myself to the use of any one of my methods, as each of them may be used to advantage under certain conditions.

One of the methods which has been found to be satisfactory for calculating the relative rate of solubility of any substantially water-insoluble inorganic compound in acid solutions, providing reliable experimental data is available, is described hereafter, as well as the technique utilized in one method of determining such data and subsequently the numerical solubility comparison factor which may be allocated to each, representing their comparative rates of solubility under a given set of conditions.

*Relative rate of solubility technique*

I have found the following technique to be satisfactory for this purpose. A standard conductivity apparatus was used to obtain measurements. Readings were taken in ohms resistance indicating H-ion depletion. Such readings were obviously slightly buffered by metallic or other ions contributed as solubility was effected and concurrently reflect depletion of the total surface. Temperature control was maintained at 25° C. within .002% of 1° F. The three mineral acids, HCl, HNO$_3$ and H$_2$SO$_4$ were each used separately in a 1/50 N. solution of 250 cc. These acids were used in preference to organic acids because at this concentration it was considered that they were 100% dissociated, which would not be true of any organic acid so utilized where progressive dissociation would destroy the integrity of the readings.

Many kinds of substantially water-insoluble inorganic compounds were tested. Most of these were ores. All samples used in such experimental work had been carefully prepared by grinding and only that fraction of the ore grind which passed a 270 mesh Tyler Standard Screen but failed to pass a 325 mesh Tyler Standard Screen was used. Uniformly diminishing particle size distribution was obtained, because of the fact that the fraction of the ore grind, minus 270 plus 325 mesh, lay within the minus 200 mesh range. This is invariably the case when a closed circuit is effected in a grinding operation in the minus 200 mesh range.

The acid containing the sample was agitated by means of a constant speed motor-driven agitator, the blades being substantially removed from the sample to effect a passing of the acid solution over the sample, rather than having the material dispersed in the solution to any appreciable degree. A Wheatstone bridge was employed, the cell being the unknown resistance, standard resistance was maintained at 50 ohms. In order to determine the point at which the bridge is in balance, a thousand cycle alternating current was passed through the circuit, null point being ascertained by telephonic head-set. Readings were graphically plotted, ohms resistance against time in minutes, all ohms resistance values being first corrected to a zero point of 450 ohms resistance, thus affording hyperbolic curves depicting relative rates of solubility because each curve approaches a certain individual plane as an asymptote.

Irrespective of the fact that either pure minerals or ores had been used in the preparation of the sample, readings so obtained obviously depicted the rate of solubility of the mineral content of the ore, as no detectable difference could be observed due to the presence of gangue, which consisted mainly of silicates. Great difficulty was encountered in obtaining reliable readings when the sample was first introduced into the acid solution for two reasons: one, the time lag due to lack of wetting instantaneously and two, the human factor of error because at this point where surface was greatest, solubility was fastest and readings had to be made with great rapidity. This did not destroy the integrity of the curve for our purposes as will be shown later, and although no solubility test was carried through to a conclusion of complete depletion of H-ions because of the enormous amount of time which would be involved, this did not constitute an obstacle as such readings were not necessary.

It should be noted that the 2 gm. sample used in all experimental work contained an excess of metallic ions compared to available H-ions in the acid solution, as the N/50 acid solution of 250 cc. contained exactly 1/200 grams of H-ions which was not sufficient to effect total solubility of all ore or mineral present and so release the total number of metallic ions contained therein. Also that when ores were used the crystalline mineral content had been completely unlocked due to the fine grinding of the sample, so that its entire surface was exposed to the acid solution, no occlusions remaining in the gangue. Each sample had been quantitatively analyzed for its metallic content, thus assuring an excess of metallic ions to H-ions.

NOTE.—The original concentration of acid in the test solution was 1/50 N irrespective of the kind of acid and at this concentration the ohms resistance across the cell was invariably the same having been mathematically corrected to 450 ohms; and because this was the point at which H-ion concentration was greatest as well as that point where the surface of the sample being tested was greatest, no solubility as yet having been effected, relative rates of solubility in grams per minute of the mineral comprising the ore or sample were calculated to this point, the acidity of the solution at that time was pH 1.699. No other point on the curve could have been used as there was no method known whereby the constantly diminishing surface could be calculated as of a given time period.

It was ascertained from experimental data obtained from testing many ores, that their rate of solubility plotted in ohms resistance against time in minutes, invariably portrayed a hyperbolic curve. Such curves may be mathematically analyzed if values at three points known to be authoritative are available and this was the method which was used. Such points were usually obtained in that region lying at 10 minute, 20 minute, and 30 minute readings, where neither the human factor of error nor the lag, due to lack of wetting, would influence the total curvature. Using these data a true hyperbolic curve could then be calculated from zero ohms resistance to total ohms resistance at complete H-ion depletion; thus furnishing data from the origin of the curve to 450 ohms resistance, which was the point from which our experimental data was obtained. It likewise provided data for the extension of the curve to infinity. Readings could then be taken from such curves which were reliable throughout the entire extent of the curve and using the value obtained on such curves at 450 ohms resistance or pH 1.699, it was then possible to calculate the rate of solubility in grams/min. of the mineral content of any ore used as a sample and finally knowing the chemical composition of the mineral it was possible to ascertain the amount of metallic ions contributed to the acid solution. By the simple method of using the factors of the logarithmic or H-ion scale it is now possible to determine the relative rate of solubility in grams/min. of such a sample in an acid solution at any given pH and from it calculate any specific surface desired for controlling such relative rate of solubility for a given time period.

I am not limited to the use of the apparatus described nor to the exclusive use of mineral acids. Any suitable apparatus may be used and any single acid, whether mineral or organic, or any mixture thereof may be employed which will effect a comparable result.

When this had been done, a solubility factor was allotted to each form so tested, based upon their mean relative rate of solubility in the mineral acids. This may be done on any suitable basis. These factors were then used to ascertain, by comparison, the required proportional specific surface each to the other of any two or more forms of the minor elements which were to be used together in compounding my fertilizer material.

*One method for determining numerical solubility comparison factors*

The calculated rate of H-ion depletion in %/min. of an ore or mineral in a N/50 acid solution having a pH 1.699, may be determined 1. By solving the following equation $$Y=\frac{N(X_1+P)}{(X_1+P+C)}$$

for the value of C and substituting the value of C so obtained in the differential equation $$\frac{DY}{DX}=\frac{(100-Y)^2}{100C}$$

and substituting 0 for the value of Y, 0 being the value of Y at the point at which we desire to determine the rate, (0 value of Y representing N/50 or pH 1.699), we obtain the rate of %/min. of H-ion depletion at pH 1.699.

Y represents ohms resistance across the cell or percent of H-ions remaining in the solution.

X represents time in minutes.

N represents the ultimate value of ohms resistance that is reached at the completion of the reaction or depletion of all H-ions.

C represents a constant, indicating rate of reaction between a H-ion and the pure mineral or ore, if used.

P represents time lag, due to lack of wetting and human factor of error, etc. indicated by the point of intersection of the pure curve on the X axis as remote from zero point. It would vary for all ores or minerals and every analysis.

It should be remembered that the zero point as used herein represents the intersection of the X and Y axis from which point all pure curves have been replotted, as the point of origin, and this should not be confused with a conventional zero point which might be construed to represent zero ohms resistance, because at this zero point the resistance has not only been measured but corrected to 450 ohms resistance.

The value of Y represents the ohms resistance across the cell or the percent of H-ions remaining in the solution, which in this instance would be the original H-ion concentration of the solution, from which solubility data was obtained. Y likewise represents a N/50 solution with a pH 1.699.

2. The specific surface of each ore tested was obtained by solving the equation $$SS = \frac{60,000}{D_s \times d} \text{ cm.}^2/\text{gm.}$$

using known values for $D_s$, density, and $d$, the mean particle size diameter.

3. Since the gram which was considered used for experimental purposes enjoyed a different specific surface for each ore, our readings in H-ion depletion, plotted against time in minutes, could not be correlated for comparative purposes for the following reason. The H-ion depletion rate plotted against time in minutes for each such ore had to be corrected so that the readings indicated what such readings would have been had each substance enjoyed the same specific surface as the others. This was done as follows:

One substance or ore was selected as a base to which the specific surface of all others were to be corrected or correlated. The ore chosen for this purpose was pyrolusite which had a known specific surface of 272 cm.²/gm. By taking the specific surface of pyrolusite 272 cm.²/gm. (our base) and dividing it by the particular specific surface of the ore or substance which is to be corrected or correlated to the same specific surface, the result was then multiplied by the rate of depletion of H-ions in %/min. at pH 1.699 of the substance being corrected.

The %/min. depletion rate at this point was selected because this was the pH of the original acid solution used for all test purposes prior to the introduction of the sample, and therefore before any solubility was effected. At this point the specific surface of any such sample would not have changed by reason of solubility.

4. The next step is to determine the H-ion depletion in gms./min. at N/50 solution or greatest intensity, where .005 gms. H-ions are available. This may be done by using the corrected rate of H-ion depletion in %/min. and multiplying it by the total amount of H-ions (by weight) present in the solution carrying .005 gram. The result may be expressed as gms./min. H-ion depletion.

5. One should then determine the total weight of metallic ions which would be displaced when the ore containing them reacted with .005 gram of H-ions present in the solution. Taking the chemical formula for the mineral with which such H-ions will react and determining the valence of the resulting compound formed after the reaction and calculating the percent weight in the mineral of the metallic ions, one may then determine the percent weight of metallic ions available as a result of the total reaction between the metal and the .005 gram of H-ions.

6. The next procedure should be to ascertain the grams per minute of such metallic ions which would be contributed to the solution as a result of reaction at pH 1.699 or N/50 acidity.

This may be done by multiplying the H-ion depletion %/min. by the weight of metallic ions displaced by .005 gram H-ions.

7. In order to ascertain the rate of solubility of a mineral in gms./min. at pH 1.699, which contained desirable metallic ions, it is merely necessary to utilize the chemical formula for the pure mineral and calculate the mineral weight based upon the metallic weight of the desired element.

8. In order to obtain "numerical solubility comparison factors" based upon the relative rate of solubility of a mineral in gms./min. in an acid solution of pH 1.699, the following procedure is employed.

As the factors are comparison factors, they must each be related to a mineral selected as a base, and for this purpose pyrolusite was chosen. Its solubility in gms./min. in an acid solution of pH 1.699 was determined to be .07635. By dividing the rate of solubility in gms./min. at pH 1.699 for each mineral being used, by that of pyrolusite (base) a "solubility comparison factor" indicating relative rates of solubility in gms./min. at pH 1.699 as related to the base substance, pyrolusite, may be obtained. For convenience the decimal point in each such determination was moved two places to the right in order that larger numbers might be obtained. This may be done without changing the relative value of the resultant factors. Such numbers are comparable and represent relative rates of solubility based upon that of pyrolusite.

Examples of "mineral solubility comparison factors" which have been determined by the foregoing method are, pyrolusite 100, galena concentrates 76.7, arsenopyrites 24.6, sphalerite concentrates 9.8 and millerite concentrates 6.05.

When these solubility factors have been arrived at for each ore or mineral being used, it is a simple matter to calculate the specific surface to which each should be ground to last a definite period of time in days indicating the growth period of the plant, and to compensate for soil characteristics, such as soil solution diffusion rates, soil pH and perhaps others, where the material is known to be used on a specific soil.

In the comminution to specification of each form of the minor elements comprising my new fertilizer material, any comminution equipment may be employed which can be so controlled as to produce predetermined particle size distribution by weight within the limits of commercial grinding. I find that a ball mill so constructed that it permits a continuous process is most satisfactory.

Feed to the mill, or grinding apparatus, should be effected by a mechanical means which affords wide variations in feed per unit of time. This unit should be capable of adjustment to provide any desired rate of feed.

Mill product should be introduced into a classification unit which may be so adjusted that it is possible to effect a close separation at any point in the particle size distribution or skew frequency of that comminuted form of the minor elements, and this with a high degree of efficiency. I find a centrifugal air classifier of proper design most satisfactory for this purpose.

The rate of feed should be adjustable so that it may be controlled.

The discharge of oversize from the classifier should be mechanically returned and mixed with the new feed to the mill in an amount of classifier oversize to new feed so that the quantity of new feed added to the oversize is the exact equivalent in weight of the fines discharged from the classifier. By this means a closed circuit is effected which, after being operated for some time, is considered to be in balance. Thereafter, the greatest efficiency in comminution to specification will be attained with uniform mill discharge, and the ratio between fine and coarse product from the classifier will then be constant.

The discharge of fines from the classifier should then be analysed to ascertain the skew frequency or weight distribution of particle size, so that this may be compared with specifications which have been prepared for that particular form of a minor element; any conventional method for the determination of particle size distribution may be used for this purpose. I prefer an approved adaptation of the hydrometer sedimentation method.

If the particle size analysis discloses that the finished product represented by the discharge of fines from the classifier is either too coarse or too fine, this may be corrected by adjusting the classifier. If the quantity of fines compared to the quantity of coarse material coming from the classifier is believed to be too small, this may be corrected by increasing the weight or size of the balls used in the mill or decreasing the rate of delivery of the feed to the mill, or both. When a small mean particle size diameter is desired, the ball mill is operated with a heavy ball charge and the rate of feed is comparatively low. When a large mean particle size diameter is desired, the ball charge should be light and the rate of feed comparatively high. Thus by varying the conditions of grinding and classifying the weight distribution of particle size and surface is controlled.

In this manner it is possible to obtain a predetermined weight distribution of particle size and concurrently a predetermined specific surface for any form of the minor elements so processed, and no particle size diameter need be greater than 74 microns nor smaller than one micron, if desired.

To eliminate any colloidal particles that may have been produced in the grinding operation, I use an exhaust blower and dust bag system which is operated at the discharge end of the mill and capable of removing particles whose particle size diameter lies below one micron. These colloidal particles not only tend to aggregate and thus prevent proper admixing, but may be definitely toxic when used as a fertilizer ingredient, their close similarity to water-soluble salts in this respect having been previously mentioned.

In order to obtain a low specific surface, which is frequently required, it is necessary that the mean particle size diameter be high. This requires the elimination of certain finer particles in the particle size distribution and is accomplished by repassing the classified material through the classifier, which has been readjusted to eliminate undesirable fine material within the critical range.

It should be appreciated that no mechanical classifier as of present-day knowledge can do more than classify within reasonably close limits, but in my experience I have realized separations that yielded better than 99 per cent within the range desired, using certain forms of the minor elements.

When any form of the minor elements has been processed to specification so that it may be regarded as finished product, it should then be blended with one or more of the others to be used, in an amount which, based upon a quantitative analysis for the minor element content in each form, assures a definite occurrence of each of such minor elements used in the final mixture in the desired proportion. Such desired quantities should preferably be based upon the saturation constant specific to the plant for those minor elements utilized, if the material is to be used for but a specific crop to the best advantage.

If the material is being compounded for use on a multiplicity of crops, such proportionate quantity occurrence of the minor elements in the final mixture should be based upon mean or average saturation constants specific to the plant for many crops, this having been ascertained from a large number of analyses for each element on all such crops.

Such mean or average saturation constants specific to the plant for many crops would naturally be influenced within comparatively wide limits by the selection of such crops. If a group of the leafy crops such as spinach, lettuce, parsley, watercress, etc. were utilized in this connection, the mean average saturation constants specific to the plant for iron would be found to be predominately higher than if root crops such as carrots, beets, turnips, potatoes, etc., were used. Likewise the tung and pecan trees as well as other plants of this character which synthesize unusual quantities of vegetable oils, if taken as a basis for mean or average saturation constants specific to the plant would show prolific requirements for zinc as compared to the citrus tree group.

The same propensities of species, or types or varieties of plants, having somewhat similar characteristics, to assimilate similar quantities of certain minor elements is today well known to the plant pathologist, physiologist and agronomist. Discretion obviously must be used in any selection of a group of plants or plant species, types or varieties from which saturation constants specific to the plant are to be taken and averaged, as a basis for the calculation of specific surface to be used in processing specifications. Fortunately, quantitative analyses for substantially all of the minor elements in many types of plant life have been made by those well qualified to do this work and such information today exists in the technical literature, to which reference may be made for guidance.

My analytical work, on 28 crops which were obtained from 32 States, in which I made determinations on some of them for 58 of the minor elements, and on many of them for 20 or more minor elements, has enabled me to obtain such data.

The variation, as referred to above, between mean or average saturation constants specific to particular groups of plants is of sufficient magnitude so that care and discretion must be exercised in the selection of the particular group of plant types to be used as a basis for the determination of the percent quantity of any minor element utilized as a component of my fertilizer material.

Variations of this order, however, have not necessitated specific surface calculations which fall without the so-called critical range of $$\frac{1,000}{D_s} \text{ cm.}^2/\text{gm. to } \frac{20,000}{D_s} \text{ cm.}^2/\text{gm.}$$

if soil solution diffusion rate is considered, although it has been found necessary in this connection to utilize this entire critical range of specific surface depending upon the plant types which are averaged as to their saturation constants for the kind of plants my new fertilizer is to be used upon.

In the preparation of specific surface specifications for the forms which are to be utilized in my fertilizer I have frequently found it necessary to take into consideration certain unusual soil types where the material was to be used and which would influence the carefully calculated relative rates of solubility of such forms through the action of base exchange, soil fixation and the excess or deficiency of either organic or colloidal material in such soils, thus providing unexpected results. A low soil solution dispersion factor due to unusual soil texture frequently is a dominant factor. In some instances of this kind trial and error methods in the field have sometimes been expedient, although such procedure is not recommended and in most instances unnecessary. Fortunately, such agricultural soils are not numerous, but if my fertilizer material is to be applied to them with any appreciable degree of efficiency such unusual conditions must be considered and taken into account, in calculating the specific surface of such of the forms containing the minor elements, as otherwise would be influenced in such an environment unfavorably.

If my new fertilizer is to be used for a specific crop which is grown in large quantities such as a field crop, i. e. cotton, corn or tobacco, it would be best to use their "saturation constants specific to the plant" for all elements used in compounding the particular fertilizer to be utilized on each such individual crop.

If my new fertilizer is to be used generally for certain types of truck crops, it should be compounded by using the average saturation constants specific to a number of such crops for all elements used in compounding the particular fertilizer to be utilized for each type, such as the leafy crop group, the root crop group, and fleshy pome crop group.

If my new fertilizer is to be used indiscriminately for all kinds and types of crops, a mean average saturation constant for all elements used should be utilized. Such "saturation constants specific to the plant" should then be obtained from several types of field crops as well as several kinds of truck crops.

Irrespective of which of the above procedures is followed for arriving at a designated quantity in percent weight to be used in my new fertilizer material, soil characteristics should be taken into consideration as previously set forth. Influencing factors considered as soil characteristics are today well known. Some of them would be soil fixation, base exchange, an excess or lack of colloidal material which would influence the rate of diffusion of the soil solutions in the soil aggregate, etc., as well as soil pH.

The procedure outlined above for determining the designated quantity of a minor element for either a specific crop, a group of similar types of crops or miscellaneous crops of all kinds, giving due consideration to soil characteristics is similar to the method which has been in vogue for the determination of quantity or percent applications of the major elements in the fertilizer industry since its inception, with this difference, however, that the saturation constants specific to one or more plants is used and then corrected for soil characteristics, rather than simply trial and error methods in the field for all crops and all soil types as is customary.

The preferred finished blended material containing the three or more desired minor elements, and in a quantity considered most advantageous for the use to which they are to be put, is in such a finely subdivided state, all particles falling as they do within the critical range from minus 200 mesh to one micron, that after such blending or admixing, segregation does not occur. This is important because thereafter no matter how handled, equal distribution of the minor elements throughout the entire mixture is assured. This is not true in the range of particle size above 74 microns.

No difficulties are encountered in a proper blending of the various forms of the minor elements when they have been comminuted so that they fall within the critical range since little or no aggregation is encountered within this range. This is important, likewise, because were this not true, an intimate admixing of the various forms of the minor elements used could not be effected, and therefore proper distribution not ensured.

My new fertilizer material should not be used except in combination with complete mixed fertilizer, if optimum results are to be obtained. Such material is never ground to a fineness comparable to my new fertilizer material. The mixing of coarse and finely ground material invariably results in segregation so that unequal distribution would occur in handling and in the field, and to avoid this I find it advantageous to granulate or pelletilize my finely comminuted fertilizer material, using any of the conventional methods, to a size which permits it being then mixed with regular mixed fertilizer and precludes segregation in this operation. There are two methods which may be employed for this purpose.

The first method which may be used is to granulate the finished product and such granulation may be effected by the introduction of a water-soluble salt which will act as a binder. I have found that as little as five percent by weight of certain water-soluble salts will effect a good granulation. The size of the granules may be controlled by slightly altering conditions in any process used and larger amounts of binder may be employed if desired. I have found either urea or sodium nitrate quite satisfactory for this purpose, although any salt which is sufficiently water-soluble may be utilized.

The second method which may be employed for effecting granulation is to incorporate designated quantities of my new fertilizer material in any of the commercial fertilizer salts. This may be done by either pelletilizing from the molten salts or by a process of granulation whereby occlusion of my new fertilizer material is accomplished by aggregation. The first process when properly used provides a pellet and the second provides a granule, within which is occluded the water-insoluble particles comprising my new fertilizer material.

The first method of granulation is more satisfactory for shipment to mixing plants where mixed fertilizer is prepared to specification. The second method is more satisfactory for use by fertilizer manufacturers who granulate their commercial product.

I claim:

1. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, the ratio of the specific surface of each said form to that of any other form being substantially inversely proportional to the ratio of their rates of solubility.

2. A fertilizer material comprising at least three substantially water-insoluble inorganic forms of the 64 reciprocally assimilable minor elements, each form being a source of a designated quantity of at least one of the minor elements, and each said form having a uniformly diminishing distribution of particle size by weight and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, the ratio of the specific surface of each said form to that of any other form being substantially inversely proportional to the ratio of their rates of solubility.

3. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, the ratio of the specific surface of each said form to that of any other form being substantially inversely proportional to the ratio of their rates of solubility, the mean particle size of each form being such as to give the desired rate of solubility in the soil upon which it is to be used.

4. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, the ratio of the specific surface of each said form to that of any other form being substantially inversely proportional to the ratio of their rates of solubility, the mean particle size of each form being such as to give the desired rate of solubility in a soil having a pH within the range of 4.5 to 6.75.

5. A fertilizer material comprising at least three substantially water-insoluble inorganic forms of the 64 reciprocally assimilable minor elements, each form being a source of a designated quantity of at least one of the minor elements, such minor element forms being occluded in at least one compound containing a major element, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, the ratio of the specific surface of each said form to that of any other form being substantially inversely proportional to the ratio of their rates of solubility.

6. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, the ratio of the specific surface of each said form to that of any other form being substantially inversely proportional to the ratio of their rates of solubility, particles of the fertilizer material being bound in the form of agglomerates by a water-soluble substance.

7. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, the ratio of the specific surface of each said form to that of any other form being substantially inversely proportional to the ratio of their rates of solubility, particles of the fertilizer material being bound in the form of agglomerates by a water-soluble substance which includes at least one major element.

8. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, each said form having a uniformly diminishing distribution of particle size by weight within said range, the mean particle size of each form being such as to give the desired rate of solubility in a soil having a pH within the range of 4.5 to 6.75.

9. A fertilizer material comprising at least three substantially water-insoluble inorganic forms of the 64 reciprocally assimilable minor elements, each form being a source of a designated quantity of at least one of the minor elements, such minor element forms being occluded in at least one compound containing a major element, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, each said form having a uniformly diminishing distribution of particle size by weight within said range, the mean particle size of each form being such as to give the desired rate of solubility in a soil having a pH within the range of 4.5 to 6.75.

10. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, each said form having a uniformly diminishing distribution of particle size by weight within said range, the mean particle size of each form being such as to give the desired rate of solubility in a soil having a pH within the range of 4.5 to 6.75, particles of the fertilizer material being bound in the form of agglomerates by a water-soluble substance.

11. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, each said form having a uniformly diminishing distribution of particle size by weight within said range, the mean particle size of each form being such as to give the desired rate of solubility in a soil having a pH within the range of 4.5 to 6.75, particles of the fertilizer material being bound in the form of agglomerates by a water-soluble substance which includes at least one major element.

12. The process of making a fertilizer material including at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

each form being present in the mixture in amount and having a specific surface effective to be gradually available to produce plant stimulation without causing objectionable toxicity, each said form having a uniformly diminishing distribution of particle size by weight within said range, the mean particle size of each form being such as to give the desired rate of solubility in a soil having a pH within the range of 4.5 to 6.75, which comprises comminuting each form in a closed system wherein particles of proper size are removed together with superfines lying without the critical range, and particles requiring further comminution are returned to the system with material which has not been previously comminuted, and mixing the particles of desired size of each form.

13. A fertilizer material comprising at least three substantially water-insoluble inorganic forms of the 64 reciprocally assimilable minor elements, each form being a source of a designated quantity of at least one of the minor elements, and having a specific surface within the range between $$\frac{1,000}{D_s} \text{ cm.}^2/\text{gm. and } \frac{20,000}{D_s} \text{ cm.}^2/\text{gm.}$$

at least three of the forms being present in the mixture in amounts and having specific surfaces effective to be gradually available to produce plant stimulation without causing objectionable toxicity, and the ratio of the specific surface of at least one form to that of at least one other form being substantially inversely proportional to the ratio of their rates of solubility, the availability of the minor element ions afforded by each other form being such that they are severally non-toxic.

14. A fertilizer material comprising at least three substantially water-insoluble inorganic forms of the 64 reciprocally assimilable minor elements, each form being a source of a designated quantity of at least one of the minor elements, and each said form having a uniformly diminishing distribution of particle size by weight and having a specific surface within the range between $$\frac{1,000}{D_s} \text{ cm.}^2/\text{gm. and } \frac{20,000}{D_s} \text{ cm.}^2/\text{gm.}$$

at least three of the forms being present in the mixture in amounts and having specific surfaces effective to be gradually available to produce plant stimulation without causing objectionable toxicity, and the ratio of the specific surface of at least one form to that of at least one other form being substantially inversely proportional to the ratio of their rates of solubility, the availability of the minor element ions afforded by each other form being such that they are severally non-toxic.

GRIFFITH H. RIDDLE.

CERTIFICATE OF CORRECTION.

Patent No. 2,280,451.　　　　　　　　　　　April 21, 1942.

GRIFFITH H. RIDDLE.

It is hereby certified that error appears in the printed specification of the above numbered patent requiring correction as follows: Page 2, first column, lines 19 and 20, for "differentiate" read --differentiates--; line 21, after "assimilation" insert a comma; line 67, for "solid" read --soil--; and second column, line 7, after "sufficiency" strike out the comma; page 4, first column, line 66, for "nown" read --known--; and second column, line 3, for "point" read --plant--; line 10, for "over application" read --over-application--; page 5, first column, line 22, for "permiting" read --permitting--; and that the said Letters Patent should be read with this correction therein that the same may conform to the record of the case in the Patent Office.

Signed and sealed this 30th day of June, A. D. 1942.

Henry Van Arsdale,
(Seal)　　　　　　　　　　　　　　Acting Commissioner of Patents.